United States Patent
Wu et al.

(10) Patent No.: US 12,026,230 B2
(45) Date of Patent: Jul. 2, 2024

(54) ONE-STAGE OBJECT DETECTING MODEL TRAINING METHOD, ELECTRICAL DEVICE AND STORAGE MEDIUM

(71) Applicant: BEIJING BAIDU NETCOM SCIENCE TECHNOLOGY CO., LTD., Beijing (CN)

(72) Inventors: Binghong Wu, Beijing (CN); Yehui Yang, Beijing (CN); DaLu Yang, Beijing (CN); Yanwu Xu, Beijing (CN); Lei Wang, Beijing (CN); Qian Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 268 days.

(21) Appl. No.: 17/555,723

(22) Filed: Dec. 20, 2021

(65) Prior Publication Data
US 2023/0195839 A1 Jun. 22, 2023

(51) Int. Cl.
G06K 9/62 (2022.01)
G06F 18/213 (2023.01)
G06F 18/214 (2023.01)
G06F 18/22 (2023.01)

(52) U.S. Cl.
CPC ........ *G06F 18/2148* (2023.01); *G06F 18/213* (2023.01); *G06F 18/22* (2023.01)

(58) Field of Classification Search
CPC ..... G06F 18/2148; G06F 18/22; G06F 18/213
See application file for complete search history.

(56) References Cited

PUBLICATIONS

Lin, T. Y., Goyal, P., Girshick, R., He, K., & Dollár, P. (2017). Focal loss for dense object detection. In Proceedings of the IEEE international conference on computer vision (pp. 2980-2988)(9 Pages) (Year: 2017).*

* cited by examiner

*Primary Examiner* — David F Dunphy
(74) *Attorney, Agent, or Firm* — Brooks Kushman P.C.

(57) ABSTRACT

Technical solutions relate to the field of artificial intelligence such as deep learning, computer vision and intelligent imaging. A method may includes during training of a one-stage object detecting model, acquiring values of a loss function corresponding to feature maps at different scales respectively in the case that classification loss calculation is required, and the loss function is a focal loss function; and determining a final value of the loss function according to the acquired values of the loss function, and training the one-stage object detecting model according to the final value of the loss function.

15 Claims, 4 Drawing Sheets

--- during training of a one-stage object detecting model, acquiring values of a loss function corresponding to feature maps at different scales respectively in the case that classification loss calculation is required, wherein the loss function is a focal loss function — 101 determining a final value of the loss function according to the acquired values of the loss function, and training the one-stage object detecting model according to the final value of the loss function — 102

ONE-STAGE OBJECT DETECTING MODEL TRAINING METHOD, ELECTRICAL DEVICE AND STORAGE MEDIUM

TECHNICAL FIELD

The present disclosure relates to the field of artificial intelligence, particular to the fields of deep learning, computer vision and intelligent imaging, and more particular to a one-stage object detecting model training method, electrical device and storage medium.

BACKGROUND

An intelligent fundus screening system is a system that can independently make an intelligent decision in line with a doctor's diagnostic experience according to fundus retinal image information of a subject and physical condition information of the subject without the assistance of professional ophthalmologist. At present, most intelligent fundus screening systems are implemented based on a deep learning technology, which may be classified into a black box model and a white box model. The white box model is of greater significance in practical application because it can output a diagnosis result and give a location of a related lesion.

The white box model is mainly implemented in two manners, of which one is end cloud interaction and the other is independent decision-making by local intelligent terminal hardware. That is, a diagnostic decision is directly made on a to-be-screened image on a local intelligent terminal. In the latter manner, the diagnostic decision is generally made using a one-stage object detecting model (or referred to as a one-stage detector). In the one-stage object detecting model, Feature Pyramid Networks (FPNs) and a focal loss function are common structures and components. In existing mainstream implementation methods for the one-stage object detecting model, feature maps at different scales in the FPN correspond to a unified value of loss function, which ignores differences between scales, thereby leading to a poor model training effect and reducing model performance.

SUMMARY

The present disclosure provides a one-stage object detecting model training method, electrical device and storage medium.

A one-stage object detecting model training method, including during training of a one-stage object detecting model, acquiring values of a loss function corresponding to feature maps at different scales respectively in the case that classification loss calculation is required, and the loss function is a focal loss function; and determining a final value of the loss function according to the acquired values of the loss function, and training the one-stage object detecting model according to the final value of the loss function.

An electronic device, including at least one processor; and a memory in communication connection with the at least one processor; and the memory stores instructions executable by the at least one processor, and the instructions are executed by the at least one processor to enable the at least one processor to perform the method as described above.

A non-transitory computer-readable storage medium storing computer instructions, which, when executed by a computer, cause the computer to perform the method as described above.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF THE DRAWINGS

The accompanying drawings are intended to provide a better understanding of the solutions and do not constitute a limitation on the present disclosure. In the drawings.

DETAILED DESCRIPTION

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description In addition, it shall be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
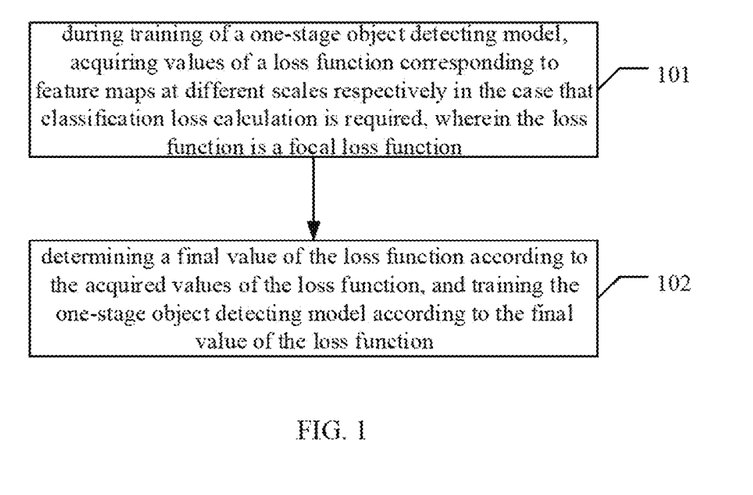
FIG. 1 is a flowchart of a one-stage object detecting model training method according to an embodiment of the present disclosure.

FIG. 1 is a flowchart of a one-stage object detecting model training method according to an embodiment of the present disclosure. As shown in FIG. 1, the following specific implementations are included.

In step 101, during training of a one-stage object detecting model, values of a loss function corresponding to feature maps at different scales are acquired respectively in the case that classification loss calculation is required, and the loss function is a focal loss function.

In step 102, a final value of the loss function is determined according to the acquired values of the loss function, and the one-stage object detecting model is trained according to the final value of the loss function.

Existing one-stage object detecting models are mainly classified into two types. One is an Anchor-based one-stage detector, which is mainly represented by a target detection network (RetinaNet) model and an efficient detection (EfficientDet) model, with a core to increase a feature fusion degree of different resolutions by a top-down structure brought by FPNs, online mines hard samples in the training through focal loss, and matches positive and negative samples by calculating an offset between the focal loss and Anchors during model training and reasoning. The other is an Anchor-free one-stage detector, which, by taking a Fully Convolutional One-Stage Object Detection (FCOS) model as an example, also performs model training through a combination of FPNs and focal loss, which, unlike the first type, matches positive and negative samples mainly through relevant information such as positions of key points.

Taking the RetinaNet model as an example, during the training of the RetinaNet model, Groundtruth on each image may match Anchors of different layers according to intersection-over-union (IoU), and the Anchor with the largest IoU is selected for calculation of a classification loss and a bounding box regression loss.

Figure 2:
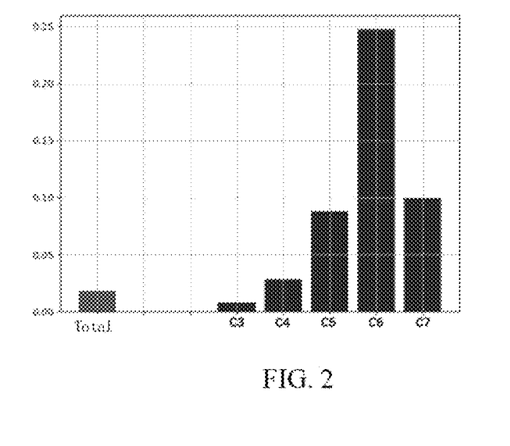
FIG. 2 is a schematic diagram of statistical results according to the present disclosure.

For Common Objects in Context (COCO), a number of positive samples that can be matched by Anchors and a number of potential negative samples in a round of iteration may be counted. FIG. 2 is a schematic diagram of statistical results according to the present disclosure.

As can be seen from FIG. 2, during the model training, a total proportion of positive and negative samples is greatly different from a proportion of positive and negative samples of feature maps at different scales, such as C3-C7. Therefore, optimization difficulties and convergence speeds of different scales also vary. If the different scales are uniformly optimized using a unified value of the loss function, an actual effect is generally poor.

To this end, in the solution of the method according to an embodiment of the present disclosure, the unified value of the loss function is replaced with values of the loss function corresponding to different scales respectively, so as to realize targeted optimization of the different scales, that is, training processes of different feature maps are optimized hierarchically, thereby improving the training effect and model performance without adding extra model parameters.

Figure 3:
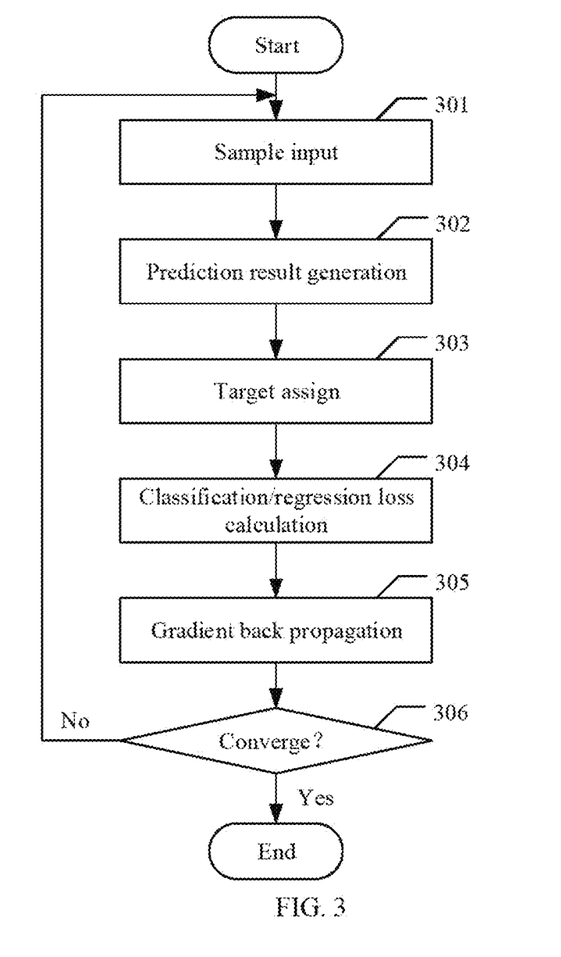
FIG. 3 is a schematic diagram of a training process of an existing one-stage object detecting model.

FIG. 3 is a schematic diagram of a training process of an existing one-stage object detecting model. As shown in FIG. 3, steps 301-305 are mainly included. That is, steps such as sample input, prediction result generation, target assign, classification/regression loss calculation, gradient back propagation are mainly included. In step 306, if convergence is determined, the flow may be ended. Otherwise, step 301 may be repeated. In the present disclosure, the classification loss calculation in the step of "classification/regression loss calculation" is mainly optimized and adjusted, and the value of the loss function corresponding to each scale is calculated separately according to predictive distribution on the single scale.

Figure 4:
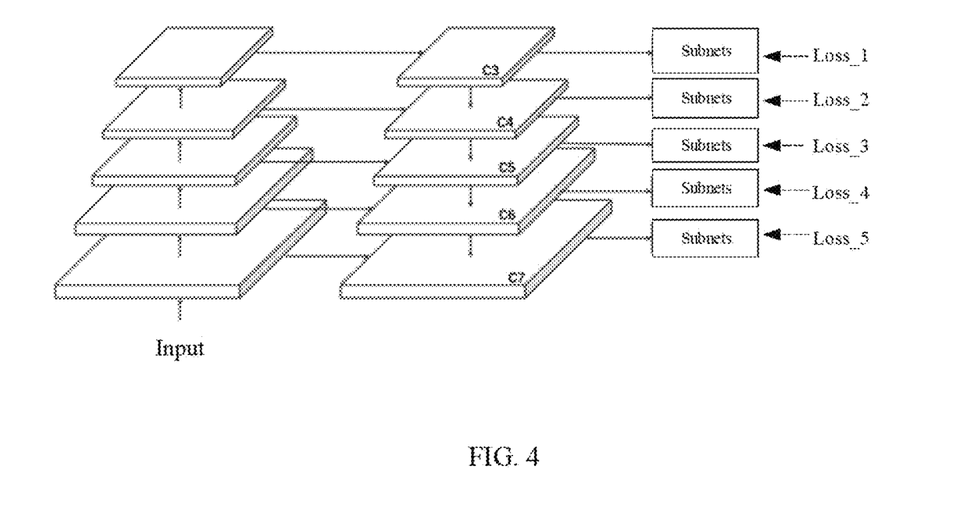
FIG. 4 is a schematic structural diagram of an Anchor-based one-stage object detecting model according to the present disclosure.

Taking an Anchor-based one-stage detector as an example, FIG. 4 is a schematic structural diagram of the Anchor-based one-stage detector according to the present disclosure. As shown in FIG. 4, on the left is a model backbone, which mainly realizes feature fusion and down-sampling operations by a multi-layer stacked convolutional layer. In the middle is a universal feature pyramid structure of the one-stage object detecting model, which mainly realizes a "top-down" feature fusion operation by a 1×1 convolutional layer and an up-sampling layer. The up-sampling layer adopts nearest neighbor interpolation. On the right are Subnets of detection frame classification/regression, which are mainly composed of multiple convolutional layers, and generate positions and probabilities of prediction frames according to a final output value and sizes of corresponding point Anchors. As shown in FIG. 4, in the present disclosure, prediction results of different Subnets are optimized additionally using loss function values Loss_1 to Loss_5 respectively.

Based on the existing focal loss, the value of the loss function may be calculated in the following manners:

$$FL(p_t) = -\partial y(1-p_t)^\gamma \log(p_t) - (1-\partial)(1-y)p_t^\gamma \log(1-p_t); \quad (1)$$

$$FL_{mean} = \frac{\sum_{k=1}^{n} FL(p_t)}{n}; \quad (2)$$

where $\partial$ denotes a positive sample weight, $\gamma$ denotes a hard sample mining degree, y denotes a sample label, $p_t$ denotes a prediction probability value (or referred to as a prediction result probability value or the like) corresponding to any sample, n denotes a total number of positive and negative samples, $FL(p_t)$ denotes a value of the loss function corresponding to any sample, and $FL_{mean}$ denotes a final value of the loss function.

$\partial$ is generally a constant (or fixed) value, which may be specifically determined according to an actual requirement. In the case of a positive sample, y may be 1. Conversely, in the case of a negative sample, y may be 0. $\gamma$ denotes a hard sample mining degree, which mainly achieves a purpose of enabling the model to focus on hard samples by suppressing weights of easy samples. During the model training, $\gamma$ may generally be set to 1.5 or 2. The greater the value of $\gamma$, the more attention may be paid to a small number of hard samples during model optimization.

Similarly, in the present disclosure, when the values of the loss function corresponding to the different scales are acquired, the following processing may be performed for any scale, that is, for each scale: acquiring the values of the loss function corresponding to samples matching the scale respectively; and calculating a mean value of the values of the loss function corresponding to the samples, and taking the mean value as the value of the loss function corresponding to the scale.

When the values of the loss function corresponding to the samples matching the scale are acquired respectively, for any scale, a first parameter corresponding to the scale may be acquired first, and the first parameter represents a hard sample mining degree; then, for any sample matching the scale, the value of the loss function corresponding to the sample may be calculated according to a prediction probability value corresponding to the sample, the first parameter, a second parameter and a third parameter, and the second parameter represents a positive sample weight and the third parameter represents a sample label.

The focal loss achieves an effect of online mining hard samples by suppressing weight of easy samples. However, during model convergence, a proportion of the hard samples may decrease as the model converges. Therefore, more samples may be assigned a lower weight with iteration, thereby being neglected in model training. Therefore, how to solve the problem of degradation during the training and maintain a continuous and effective return gradient are also problems to be solved in the present disclosure.

Correspondingly, in the present disclosure, for any scale and in each batch during the training, the first parameter corresponding to the scale may be determined according to an average difficulty degree of the samples matching the scale in the batch, so as to achieve effects of paying attention to more hard samples in an initial stage of the training and dynamically improving a degree of suppression of easy samples in the focal loss hierarchically with the iteration process.

Specifically, for any scale and in each batch during the training, a mean value of prediction probability values corresponding to positive samples matching the scale in the batch may be calculated, a logarithm of the mean value may be taken, and a negative number of a logarithmic result may be taken as the first parameter corresponding to the scale.

Based on the above introduction, the following formulas are given:

$$AFL(p_t) = \qquad (3)$$
$$-\partial y(1-p_t)^{-log(\overline{p_{pos}})}log(p_t) - (1-\partial)(1-y)p_t^{-log(\overline{p_{pos}})}log(1-p_t);$$

$$\overline{p_{pos}} = \sum_{k=1}^{m} \frac{y \cdot p_t}{m}; \qquad (4)$$

Where $AFL(p_t)$ denotes a loss function value corresponding to any sample, that is, a value of an adaptive focal loss, $\partial$ denotes the second parameter, representing a positive sample weight, y denotes the third parameter, representing a sample label, $p_t$ denotes a prediction probability value corresponding to any sample, $-log(\overline{p_{pos}})$ denotes the first parameter, corresponding to $\gamma$ in the formula (1), m denotes a number of positive samples matching the scale corresponding to the "any sample", and for the positive samples, y is 1, and thus y in the formula (4) may also be omitted.

After the loss function values corresponding to the samples matching the scale are acquired respectively for any scale, a mean value of the acquired values of the loss function corresponding to the samples may be calculated, and the mean value is taken as the value of the loss function corresponding to the scale.

Further, a final value of the loss function may be determined according to the acquired values of the loss function corresponding to the scales. For example, a mean value of the acquired values of the loss function corresponding to the scales may be calculated, and the mean value is taken as the final value of the loss function.

That is, $AFL_{mean} = (AFL_1 + AFL_2 + AFL_3 + AFL_4 + AFL_5)/5;$ (5)

$AFL_1$ denotes a value of the loss function corresponding to C3 shown in FIG. 4, $AFL_2$ denotes a value of the loss function corresponding to C4 shown in FIG. 4, and so on, $AFL_{mean}$ denotes a final value of the loss function.

The one-stage object detecting model may be trained according to the final value of the loss function, and specific implementation thereof is the prior art.

After the above processing manner is adopted, the focal loss may pay more attention to the optimization of hard samples at an initial stage of model training due to a large number of hard samples. With the continuous training iteration of the model, the hard samples tend to decrease, and the model still maintains effective gradient return during the training, rather than ignoring the vast majority of samples as in the existing focal loss, thereby further improving the model training effect and the model performance.

In addition, the one-stage object detecting model obtained by training according to the manner described in the present disclosure may be applied to actual fundus screening, and may improve accuracy of screening results.

Still taking the RetinaNet model as an example, Table 1 is a schematic diagram of comparison between performance of the RetinaNet model obtained in the manner described in the present disclosure, i.e., an Ad-RetinaNet model and performance of the existing RetinaNet model.

TABLE 1

| | Comparison between performance | | | | | | |
|---|---|---|---|---|---|---|---|
| Method | Backbone | AP | $AP_{50}$ | $AP_{75}$ | $AP_S$ | $AP_M$ | $AP_L$ |
| RetinaNet | R-50-FPN | 35.7 | 55.0 | 38.5 | 18.9 | 38.9 | 46.3 |
| Ad-RetinaNet | R-50-FPN | 36.8 | 56.2 | 39.2 | 20.6 | 39.7 | 46.0 |
| | | (+1.1) | (+1.2) | (+0.7) | (+1.7) | (+0.8) | |
| RetinaNet | R-101-FPN | 39.1 | 59.1 | 42.3 | 21.8 | 42.7 | 50.2 |
| Ad-RetinaNet | R-101-FPN | 40.5 | 60.1 | 43.3 | 23.4 | 44.0 | 50.7 |
| | | (+1.4) | (+1.0) | (+1.0) | (+1.6) | (+1.3) | (+0.5) |
| RetinaNet | X-101-FPN | 40.8 | 61.1 | 44.1 | 24.1 | 44.2 | 51.2 |
| Ad-RetinaNet | X-101-FPN | 41.2 | 61.2 | 44.2 | 24.4 | 45.8 | 52.8 |
| | | (+0.4) | (+0.1) | (+0.1) | (+0.3) | (+0.4) | (+0.4) |

As shown in Table 1, performance may be verified based on a COCO data set, with average precision (AP) as an evaluation index, including AP, $AP_{50}$, $AP_{75}$, APs, $AP_M$ and $AP_L$, etc. Specific meanings thereof are all prior arts. As shown in Table 1, compared with the existing RetinaNet model, the Ad-RetinaNet model has a significant improvement in performance.

It is to be noted that for the sake of simplicity, the method embodiments described above are described as a combination of a series of actions. However, those of ordinary skill in the art should understand that the present disclosure is not limited by the order of action described. Therefore, according to the present disclosure, some steps may be performed in another order or at the same time. Secondly, those of ordinary skill in the art should also know that the embodiments described in the specification are exemplary embodiments and the actions and modules involved are not necessary to the present disclosure.

The above is the introduction to the method embodiments. The following is a further illustration of the solutions according to the present disclosure through apparatus embodiments.

Figure 5:
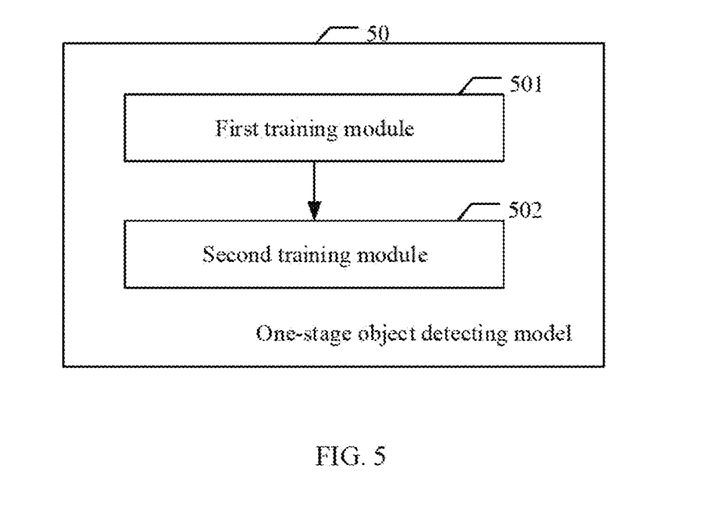
FIG. 5 is a schematic structural diagram of composition of a one-stage object detecting model training apparatus 50 according to an embodiment of the present disclosure.

FIG. 5 is a schematic structural diagram of composition of a one-stage object detecting model training apparatus 50 according to an embodiment of the present disclosure. As shown in FIG. 5, the apparatus includes a first training module 501 and a second training module 502.

The first training module 501 is configured to, during training of a one-stage object detecting model, acquire values of a loss function corresponding to feature maps at different scales respectively in the case that classification loss calculation is required, and the loss function is a focal loss function.

The second training module 502 is configured to determine a final value of the loss function according to the acquired values of the loss function, and train the one-stage object detecting model according to the final value of the loss function.

Specifically, the first training module 501 may perform the following processing for any scale: acquiring values of the loss function corresponding to samples matching the scale respectively; and calculating a mean value of the values of the loss function corresponding to the samples, and taking the mean value as the value of the loss function corresponding to the scale.

The first training module 501 may perform the following processing for any scale: acquiring a first parameter corresponding to the scale, the first parameter represents a hard sample mining degree; and for any sample matching the scale, calculating the value of the loss function corresponding to the sample according to a prediction probability value corresponding to the sample, the first parameter, a second parameter and a third parameter, the second parameter represents a positive sample weight, and the third parameter represents a sample label.

The first training module 501 may, for any scale and in each batch during the training, determine the first parameter corresponding to the scale according to an average difficulty degree of the samples matching the scale in the batch.

For example, the first training module 501 may, for any scale and in each batch during the training, calculate a mean value of prediction probability values corresponding to positive samples matching the scale in the batch, take a logarithm of the mean value, and take a negative number of a logarithmic result as the first parameter corresponding to the scale.

In addition, the second training module 502 may determine a final value of the loss function according to the values of the loss function corresponding to the scales, for example, calculate a mean value of the values of the loss function corresponding to the scales, and take the mean value as the final value of the loss function.

Further, the second training module 502 may also train the one-stage object detecting model according to the final value of the loss function.

The specific workflow of the apparatus embodiment shown in FIG. 5 can be obtained with reference to the related description in the above method embodiment and is not repeated.

In conclusion, by use of the solution in the apparatus embodiment of the present application, the unified value of the loss function may be replaced with the values of the loss function corresponding to different scales respectively, so as to realize targeted optimization of the different scales, thereby improving the model training effect and the model performance.

The technical solutions described in the present disclosure may be applied to the field of artificial intelligence, and in particular, to the field of artificial intelligence such as deep learning, computer vision and intelligent imaging.

Artificial intelligence is a discipline that studies how to make computers simulate certain thinking processes and intelligent behaviors (such as learning, reasoning, thinking and planning) of human beings, which includes hardware technologies and software technologies. The artificial intelligence hardware technologies generally include sensors, dedicated artificial intelligence chips, cloud computing, distributed storage, big data processing and other technologies. The artificial intelligence software technologies mainly include a computer vision technology, a speech recognition technology, a natural language processing technology, machine learning/deep learning, a big data processing technology, a knowledge graph technology and other major directions.

According to embodiments of the present disclosure, the present disclosure further provides an electronic device, a readable storage medium and a computer program product.

Figure 6:
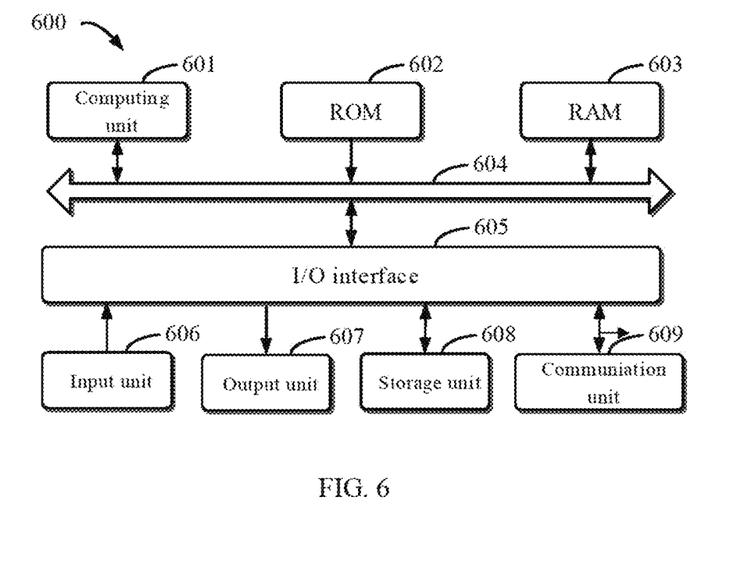
FIG. 6 is a schematic block diagram of an exemplary electronic device 600 that can be configured to implement embodiments of the present disclosure.

FIG. 6 is a schematic block diagram of an exemplary electronic device 600 that can be configured to implement embodiments of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 6, the device 600 includes a computing unit 601, which may perform various suitable actions and processing according to a computer program stored in a read-only memory (ROM) 602 or a computer program loaded from a storage unit 608 into a random access memory (RAM) 603. The RAM 603 may also store various programs and data required to operate the device 600. The computing unit 601, the ROM 602 and the RAM 603 are connected to one another by a bus 604. An input/output (I/O) interface 605 may also be connected to the bus 604.

A plurality of components in the device 600 are connected to the I/O interface 605, including an input unit 606, such as a keyboard and a mouse; an output unit 607, such as various displays and speakers; a storage unit 608, such as disks and discs; and a communication unit 609, such as a network card, a modem and a wireless communication transceiver. The communication unit 609 allows the device 600 to exchange information/data with other devices over computer networks such as the Internet and/or various telecommunications networks.

The computing unit 601 may be a variety of general-purpose and/or special-purpose processing components with processing and computing capabilities. Some examples of the computing unit 601 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 601 performs the methods and processing described above, such as the methods described in the present disclosure. For example, in some embodiments, the method described in the present disclosure may be implemented as a computer software program that is tangibly embodied in a machine-readable medium, such as a storage unit 608. In some embodiments, part or all of a computer program may be loaded and/or installed on the device 600 via the ROM 602 and/or the communication unit 609. One or more steps of the method described in the present disclosure may be performed when the computer program is loaded into the RAM 603 and executed by the computing unit 601. Alternatively, in other embodiments, the computing unit 601 may be configured to perform the methods described in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, coupled to receive data and instructions from a storage system, at least one input device, and at least one output device, and to transmit data and instructions to the storage system, the at least one input device, and the at least one output device.

Program codes configured to implement the methods in the present disclosure may be written in any combination of one or more programming languages. Such program codes may be supplied to a processor or controller of a general-purpose computer, a special-purpose computer, or another programmable data processing device to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display device (e.g., a cathode-ray tube (CRT) or a liquid crystal display (LCD) monitor) for displaying information to the user; and a keyboard and a pointing device (e.g., a mouse or trackball) through which the user may provide input for the computer. Other kinds of devices may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A one-stage object detecting model training method, comprising:
    during training of a one-stage object detecting model, acquiring values of a loss function corresponding to feature maps at different scales respectively in the case that classification loss calculation is required, wherein the loss function is a focal loss function; and
    determining a final value of the loss function according to the acquired values of the loss function, and training the one-stage object detecting model according to the final value of the loss function,
    wherein acquiring the values of the loss function corresponding to feature maps at different scales comprises:
    performing the following processing for any scale:
    acquiring values of the loss function corresponding to samples matching the scale respectively; and
    calculating a mean value of the values of the loss function corresponding to the samples, and taking the mean value as the value of the loss function corresponding to the scale.

2. The method according to claim 1, wherein acquiring the values of the loss function corresponding to samples matching the scale respectively comprises:
    performing the following processing for any scale:
    acquiring a first parameter corresponding to the scale, wherein the first parameter represents a hard sample mining degree; and for any sample matching the scale, calculating the value of the loss function corresponding to the sample according to a prediction probability value corresponding to the sample, the first parameter, a second parameter and a third parameter, wherein the second parameter represents a positive sample weight and the third parameter represents a sample label.

3. The method according to claim 2, wherein acquiring the first parameter corresponding to the scale comprises:
for any scale and in each batch during the training, determining the first parameter corresponding to the scale according to an average difficulty degree of the samples matching the scale in the batch.

4. The method according to claim 3, wherein determining the first parameter corresponding to the scale according to the average difficulty degree of the samples matching the scale in the batch comprises:
calculating a mean value of prediction probability values corresponding to positive samples matching the scale in the batch, taking a logarithm of the mean value, and taking a negative number of a logarithmic result as the first parameter corresponding to the scale.

5. The method according to claim 1, wherein determining the final value of the loss function according to the acquired values of the loss function comprises:
calculating a mean value of the acquired values of the loss function, and taking the mean value as the final value of the loss function.

6. An electronic device, comprising:
at least one processor; and
a memory in communication connection with the at least one processor; wherein
the memory stores instructions executable by the at least one processor, and the instructions are executed by the at least one processor to enable the at least one processor to perform a one-stage object detecting model training method, which comprises:
during training of a one-stage object detecting model, acquiring values of a loss function corresponding to feature maps at different scales respectively in the case that classification loss calculation is required, wherein the loss function is a focal loss function; and
determining a final value of the loss function according to the acquired values of the loss function, and training the one-stage object detecting model according to the final value of the loss function,
wherein acquiring the values of the loss function corresponding to feature maps at different scales comprises:
performing the following processing for any scale:
acquiring values of the loss function corresponding to samples matching the scale respectively; and
calculating a mean value of the values of the loss function corresponding to the samples, and taking the mean value as the value of the loss function corresponding to the scale.

7. The electronic device according to claim 6, wherein acquiring the values of the loss function corresponding to samples matching the scale respectively comprises:
performing the following processing for any scale:
acquiring a first parameter corresponding to the scale, wherein the first parameter represents a hard sample mining degree; and
for any sample matching the scale, calculating the value of the loss function corresponding to the sample according to a prediction probability value corresponding to the sample, the first parameter, a second parameter and a third parameter, wherein the second parameter represents a positive sample weight and the third parameter represents a sample label.

8. The electronic device according to claim 7, wherein acquiring the first parameter corresponding to the scale comprises:
for any scale and in each batch during the training, determining the first parameter corresponding to the scale according to an average difficulty degree of the samples matching the scale in the batch.

9. The electronic device according to claim 8, wherein determining the first parameter corresponding to the scale according to the average difficulty degree of the samples matching the scale in the batch comprises:
calculating a mean value of prediction probability values corresponding to positive samples matching the scale in the batch, taking a logarithm of the mean value, and taking a negative number of a logarithmic result as the first parameter corresponding to the scale.

10. The method according to claim 6, wherein determining the final value of the loss function according to the acquired values of the loss function comprises:
calculating a mean value of the acquired values of the loss function, and taking the mean value as the final value of the loss function.

11. A non-transitory computer-readable storage medium storing computer instructions, which, when executed by a computer, cause the computer to perform a one-stage object detecting model training method, which comprises:
during training of a one-stage object detecting model, acquiring values of a loss function corresponding to feature maps at different scales respectively in the case that classification loss calculation is required, wherein the loss function is a focal loss function; and
determining a final value of the loss function according to the acquired values of the loss function, and training the one-stage object detecting model according to the final value of the loss function,
wherein acquiring the values of the loss function corresponding to feature maps at different scales comprises:
performing the following processing for any scale:
acquiring values of the loss function corresponding to samples matching the scale respectively; and
calculating a mean value of the values of the loss function corresponding to the samples, and taking the mean value as the value of the loss function corresponding to the scale.

12. The non-transitory computer-readable storage medium according to claim 11, wherein acquiring the values of the loss function corresponding to samples matching the scale respectively comprises:
performing the following processing for any scale:
acquiring a first parameter corresponding to the scale, wherein the first parameter represents a hard sample mining degree; and
for any sample matching the scale, calculating the value of the loss function corresponding to the sample according to a prediction probability value corresponding to the sample, the first parameter, a second parameter and a third parameter, wherein the second parameter represents a positive sample weight and the third parameter represents a sample label.

13. The non-transitory computer-readable storage medium according to claim 12, wherein acquiring the first parameter corresponding to the scale comprises:
for any scale and in each batch during the training, determining the first parameter corresponding to the scale according to an average difficulty degree of the samples matching the scale in the batch.

14. The non-transitory computer-readable storage medium according to claim 13, wherein determining the first parameter corresponding to the scale according to the average difficulty degree of the samples matching the scale in the batch comprises:

calculating a mean value of prediction probability values corresponding to positive samples matching the scale in the batch, taking a logarithm of the mean value, and taking a negative number of a logarithmic result as the first parameter corresponding to the scale.

15. The non-transitory computer-readable storage medium according to claim 11, wherein determining the final value of the loss function according to the acquired values of the loss function comprises:

calculating a mean value of the acquired values of the loss function, and taking the mean value as the final value of the loss function.

* * * * *